(12) United States Patent
Berman et al.

(10) Patent No.: US 10,228,880 B2
(45) Date of Patent: Mar. 12, 2019

(54) POSITION-AWARE PRIMARY COMMAND QUEUE MANAGEMENT

(71) Applicant: HGST Netherlands B.V., Amsterdam (NL)

(72) Inventors: David Berman, San Jose, CA (US); Abhishek Dhanda, San Jose, CA (US); Toshiki Hirano, San Jose, CA (US); Satoshi Yamamoto, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 70 days.

(21) Appl. No.: 15/257,431

(22) Filed: Sep. 6, 2016

(65) Prior Publication Data

US 2018/0067694 A1 Mar. 8, 2018

(51) Int. Cl.
*G06F 3/06* (2006.01)

(52) U.S. Cl.
CPC .......... *G06F 3/0659* (2013.01); *G06F 3/0611* (2013.01); *G06F 3/0689* (2013.01)

(58) Field of Classification Search
CPC .... G06F 3/0659; G06F 3/0611; G06F 3/0656; G06F 2212/261
See application file for complete search history.

(56) References Cited

U.S. PATENT DOCUMENTS

| | | | |
|---|---|---|---|
| 6,088,740 A | 7/2000 | Ghaffari et al. | |
| 6,567,886 B1 | 5/2003 | Saitoh et al. | |
| 6,898,664 B2 | 5/2005 | Matthews et al. | |
| 6,917,992 B2 | 7/2005 | Grimsrud et al. | |
| 7,003,644 B2 | 2/2006 | Heath et al. | |
| 7,320,050 B2 | 1/2008 | Kobayashi et al. | |
| 7,620,747 B1 | 11/2009 | Overby et al. | |
| 8,327,093 B2 | 12/2012 | Olds et al. | |
| 2003/0084261 A1* | 5/2003 | Byrd | G06F 3/061 711/167 |
| 2008/0320241 A1* | 12/2008 | Dees | G06F 3/0613 711/151 |
| 2010/0262979 A1 | 10/2010 | Borchers et al. | |
| 2015/0237139 A1* | 8/2015 | Chen | H04L 67/1097 709/217 |

(Continued)

OTHER PUBLICATIONS

Optimizing Solid State Drive performance by separating Flash management and host controller command processing, ip.com Prior art database, Jul. 1, 2013, 2 pages (Abstract included) https://priorart.ip.com/IPCOM/000228720.

*Primary Examiner* — Hiep T Nguyen (57) ABSTRACT

The examples described herein discuss various systems, software, devices, and methods for managing a primary command queue by ordering and/or reordering and distributing incoming commands based, at least in part, on positional information of one or more components of data storage devices. More specifically, in some embodiments, the examples discussed herein describe ordering and distributing incoming commands from a primary command queue in a position-aware manner that takes into account disk rotation (e.g., rotational position) and/or actuator head location for the various data storage devices of a data storage system enclosure. Among other benefits, ordering incoming commands at the primary command queue and distributing the ordered commands to individual device queues improves overall command execution latency.

21 Claims, 6 Drawing Sheets

(56) References Cited

U.S. PATENT DOCUMENTS

2016/0299686 A1* 10/2016 Nagashima ............. G06F 3/061
2016/0308968 A1* 10/2016 Friedman ............ H04L 67/2842
2017/0277434 A1*  9/2017 Jung ..................... G06F 3/0604

* cited by examiner

POSITION-AWARE PRIMARY COMMAND QUEUE MANAGEMENT

TECHNICAL FIELD

Aspects of the disclosure relate to the field of data storage and, more particularly, to position-aware primary command queue management for data storage enclosures.

TECHNICAL BACKGROUND

Computer and network systems (such as data storage systems, server systems, cloud storage systems, personal computers, and workstations) typically include data storage devices for storing and retrieving data. These data storage devices can include hard disk drives (HDDs), solid-state drives (SSDs), tape storage devices, optical storage drives, hybrid storage devices that include both rotating and solid-state data storage elements, and other mass storage devices.

As networked computer systems grow in numbers and capability, there is a need for more storage system capacity. Cloud computing and large-scale data processing further increase the need for digital data storage systems that are capable of transferring and holding very large amounts of data. Data centers typically include many rack-mountable storage units, which store the large amounts of data.

One approach to providing sufficient data storage in data centers is the use of arrays of independent data storage devices. Many data storage devices can be held in an electronics enclosure. An electronics enclosure is a modular unit that can hold and operate independent data storage devices in an array, computer processors, routers and other electronic equipment. The data storage devices are held and operated in close proximity within the electronics enclosure, so that many data storage devices can be fit into a defined volume. Operating many data storage devices within close proximity within the electronics enclosure can create heat or vibration issues leading to premature failure of the data storage devices. Accordingly, electronics enclosures typically include fans or other cooling devices. For example, an enclosure may have fans on one side pulling out hot air while cold air enters the enclosure at the opposite end. This results in a temperature gradient across the subsystem.

Host or server systems typically attempt to distribute storage operations evenly or uniformly among the available data storage devices. For example, the host system or server accepts incoming storage commands, sorts the commands in a primary command queue according to logical block addresses (LBAs) and issues or sends the commands to individual queues of data storage devices. Unfortunately, the host system or server has no knowledge of how the individual device command queues handle the commands. This lack of knowledge can result in, among other deleterious effects, unnecessary command execution latency and power usage by the data storage devices.

OVERVIEW

To provide enhanced operation of data storage devices and systems, various systems, apparatuses, methods, and software are provided herein. In a first example, a data storage system is presented. The data storage system includes multiple data storage devices each configured to store data, an enclosure configured to encase and physically support the multiple storage devices, and a control system. The control system is configured to manage a primary command queue by ordering incoming storage commands based, at least in part, on positional information of one or more components of the multiple data storage devices.

In another example, a method of managing a primary command queue is provided. The method includes monitoring incoming storage commands for distribution to data storage devices in an enclosure of a data storage system, maintaining device queue command handling models for each device queue of the multiple data storage devices in the storage enclosure to estimate positional information of one or more components of the multiple data storage devices, and ordering the incoming commands in the primary command queue based, at least in part, on the positional information of the one or more components of the multiple data storage devices.

In another example, a computer-readable storage medium is provided. The computer-readable storage medium includes instructions which, when executed by one or more processors, cause the one or more processors to monitor incoming storage commands for distribution to data storage devices in an enclosure of a data storage system, maintain device queue command handling models for each device queue of the multiple data storage devices in the storage enclosure to estimate positional information of one or more components of the multiple data storage devices, and order the incoming commands in the primary command queue based, at least in part, on the positional information of the one or more components of the multiple data storage devices.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Data storage devices, such as hard disk drives (HDDs), solid-state drives (SSDs), and hybrid disk drives that have both rotating and solid-state storage elements, can be included in various arrayed configurations, such as rack-mounted modular enclosures that house dozens of individual drives. Drives that incorporate rotating media, such as rotating magnetic media of hard disk drives or hybrid disk drives, among others, also include various electromechanical elements to position read/write heads over the spinning media. These drives also include drive controllers that manage corresponding device queues to optimize how commands received from a primary (or host) command queue are executed by the drive. Specifically, the drive controllers schedule or order the operations in corresponding device command queues in a position-aware manner that takes into account disk rotation (e.g., rotational position) and read/write head location.

A host system or storage controller includes a primary command queue controller that orders and distributes incoming commands using a primary command queue. Unfortunately, as discussed above, the primary command queue controller distributes or issues storage operations or commands among the available data storage devices irrespective of what each individual drive is doing. This can result in unnecessary command execution latency.

The examples described herein discuss various systems, software, devices, and methods for managing a primary command queue by ordering and/or reordering and distributing incoming commands based, at least in part, on positional information of one or more components of the data storage devices. More specifically, in some embodiments, the examples discussed herein describe ordering and distributing incoming commands from a primary command queue in a position-aware manner that takes into account disk rotation and/or actuator head location for the various data storage devices of a data storage system enclosure. Among other benefits, ordering incoming commands at the primary command queue and distributing the ordered commands to individual device queues improves overall command execution latency. More specifically, the ordering reduces average or tail command execution latency.

Figure 1:
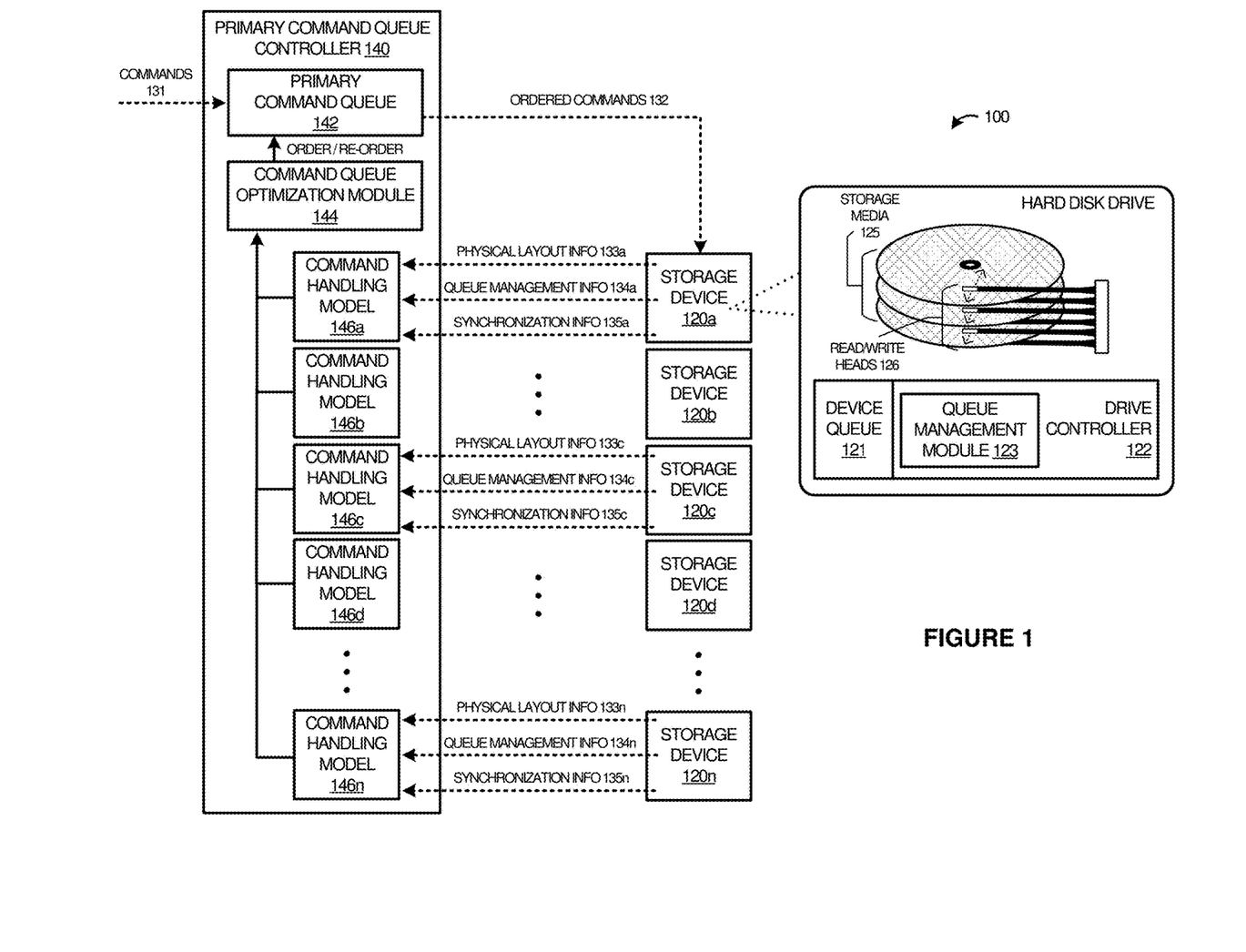
FIG. 1 depicts a system diagram illustrating an example primary command queue controller and multiple data storage devices.

FIG. 1 depicts a system diagram illustrating an example system 100. Example system 100 includes a primary command queue controller 140 and multiple data storage devices 120a-120n. The primary command queue controller 140 and the multiple data storage devices 120a-120n can be included in an environment that includes one or more data storage arrays, such as, for example, a rackmount computing environment. As discussed herein, the primary command queue controller 140 can be located at, for example, the operating system level or file system level, depending on the architecture of the storage system. Various example deployments of the primary command queue controller 140 are shown and discussed in greater detail with reference to FIGS. 3A and 3B.

As shown in the example of FIG. 1, each of data storage devices 120a-120n can include one or more rotating storage media. An example exploded view of data storage device 120a is shown in the example of FIG. 1 including rotating storage media 125, read/write heads/armature assembly 126, device queue 121 and drive controller 122. Drive controller 122 includes a queue management module 123 that manages ordering and handling of commands in device queue 121. Combinations or variations of rotating, solid-state storage media and/or other media types are also possible.

The primary command queue controller 140 includes a primary command queue 142, a command queue optimization module 144, and multiple command handling models 146a-146n. As discussed herein, the primary command queue controller 140 can generate the command handling models 146a-146n (described below) based on corresponding physical layout information 133a-133n and queue management information 134a-134n. The physical layout information 133a-133n can indicate, for example, how data is stored on a particular data storage device. For example, the physical layout information can be or include a logical block address (LBA) to cylinder, head and sector (CHS) translation for the data storage device. The queue management information 134a-134n can be or include queue management algorithmic information such as, for example, a rotational position optimization (RPO) algorithm indicating how a particular data storage device processes commands in a corresponding device queue 121.

The command handling models 146a-146n can be maintained using synchronization information or messages 135a-135n that are provided to the primary command queue controller 140 from each of the multiple data storage devices 120a-120n. The synchronization information 135a-135n can be used by the primary command queue controller 140 to synchronize clocks and timers of the multiple command handling models 146a-146n. The synchronization can occur initially upon power cycle or plug-in and, occasionally, periodically, etc., thereafter. For example, after the initial synchronization, the synchronization occurs occasionally and/or periodically in order to account for clock drift and, additionally, to account for background tasks (e.g., scan tasks) that the data storage devices 120a-120n perform without the knowledge of the host system or primary command queue controller 140.

In some embodiments, the synchronization information 135a-135n can include timestamps indicating when a particular data storage device commenced execution of a storage operation and/or when the particular data storage device completed the storage operation. The primary command queue controller 140 compares the timestamp(s) to expected values and adjusts the command handling models' clocks and/or timers accordingly. In some embodiments, the timestamp(s) can be included and/or otherwise embedded in responses, etc.

Each command handling model 146a-146n can, among other functions, model how a respective data storage device 120a-120n processes commands in a corresponding device queue in order to estimate positional information of the one or more components of the multiple data storage devices. The positional information of the one or more components of the multiple data storage devices can include disk rotation information (e.g., rotational position), read/write actuator head locations, etc. As discussed, each command handling model 146a-146n includes corresponding queue management information 134a-134n, which can be algorithmic information such as, for example, a rotational position optimization (RPO) algorithm indicating how a particular data storage device processes commands in a corresponding device queue. Additionally, each command handling model 146a-146n can maintain variables, timers, etc., in order to maintain synchronization with the corresponding device queue.

As shown in the example of FIG. 1, the command queue optimization module 144 interacts with the multiple command handling models 146a-146n to obtain the estimated real-time or near real-time positional information of the one or more components of the multiple data storage devices and physical layout information 133a-133n. This information is used to order and/or reorder incoming commands 131 in the primary command queue 142. The primary command queue controller 140 subsequently issues the ordered (or reordered) commands 132 from the primary command queue 142 to the appropriate storage devices 120a-120n.

Figure 2:
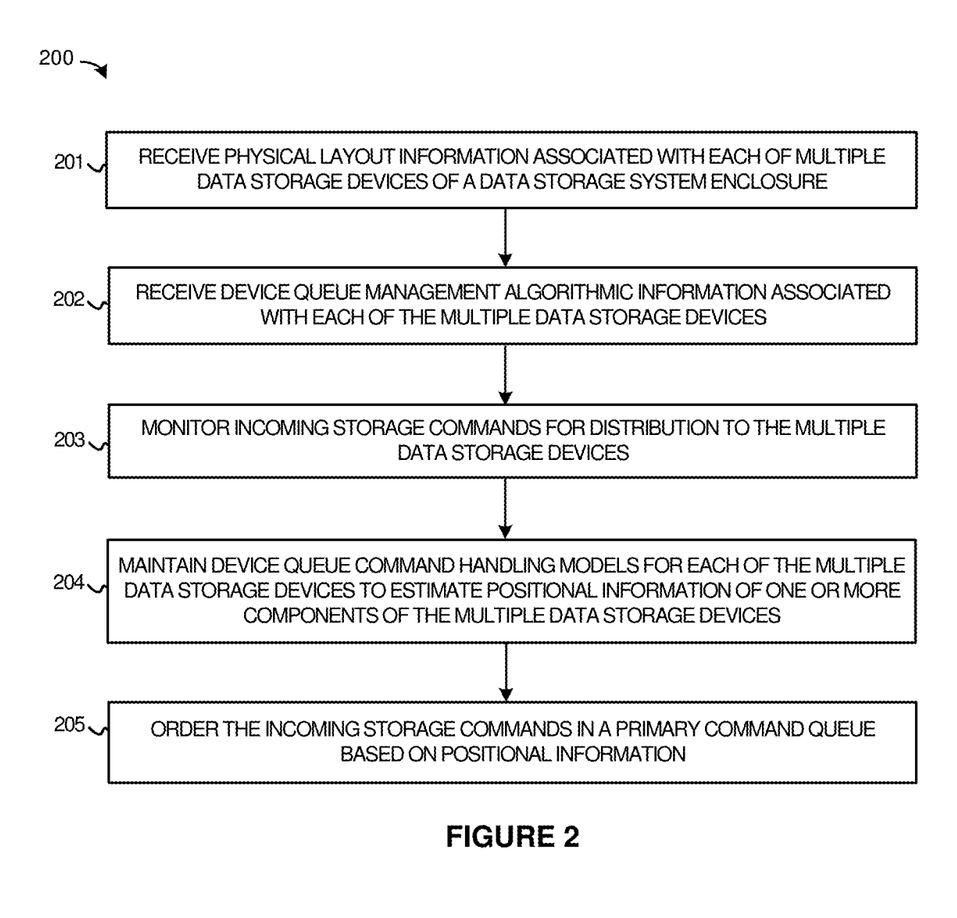
FIG. 2 depicts a flow diagram illustrating an example method of operating a primary command queue controller.

To further illustrate the operation of example system 100, FIG. 2 is provided. FIG. 2 depicts a flow diagram 200 illustrating an example method of managing a primary command queue 142. More specifically, the example of FIG.

2 illustrates an example of ordering incoming commands to the primary command queue in a position-aware manner. The operations of FIG. 2 are discussed below with reference to performance by one or more components of a primary command queue controller 140 of FIG. 1. As discussed herein, the one or more components of the primary command queue controller 140 can be located or deployed at the operating system level (e.g., FIG. 3A) or file system level (e.g., FIG. 3B) depending on architecture of the storage system. Other deployments including combinations or variations thereof are also possible.

At operation 201, the primary command queue controller 140 receives physical layout information 133a-133n associated with each of multiple data storage devices 120a-120n housed within a data storage system enclosure. The physical layout information 133a-133n can be, for example, transferred by a data storage device 120 initially and again in the event that the information changes. Alternatively or additionally, the physical layout information 133a-133n can be transferred responsive to a power cycle, etc. The physical layout information can illustrate how logical block addresses (LBAs) are mapped on the data storage device. The LBAs are sequential integers. Some systems assume that sequential LBAs are proximate or adjacent on a data storage device. However, even adjacent LBAs can require substantially moving one or more read/write actuator heads. For example, LBAs can be arranged in a zig-zag fashion straddling differing surfaces (or platters) and different radii. The physical layout information can be a logical block address (LBA) to cylinder, head and sector (CHS) translation or mapping for a particular data storage device. Furthermore, each data storage device can have its own unique physical layout. Example physical layouts are shown and discussed in greater detail with reference to FIGS. 4A and 4B.

At operation 202, the primary command queue controller 140 receives device queue management algorithmic information 134a-134n associated with each of the multiple data storage devices 120a-120n. The queue management information 134a-134n can be algorithmic information such as, for example, a rotational position optimization (RPO) algorithm indicating how a particular data storage device processes commands in a corresponding device queue 121.

At operation 203, the primary command queue controller 140 monitors incoming storage commands 131 for distribution to the multiple data storage devices 120a-120n. In some embodiments, the incoming commands can originate from users of, for example, a data storage system.

At operation 204, the primary command queue controller 140 generates and/or maintains device queue command handing models 146a-146n for each of the multiple data storage devices 120a-120n. In some embodiments, the device queue command handing models 146a-146n can be used to estimate positional information of one or more components of the multiple data storage devices.

At operation 205, the primary command queue controller 140 orders the incoming storage commands 131 in the primary command queue 142 based, at least in part, on the estimated positional information of one or more components of the multiple data storage devices 120a-120n. In some embodiments, the incoming commands 131 in the primary command queue 142 are further ordered for reducing vibration of one or more of the multiple data storage devices, reducing seek current overages of one or more of the multiple data storage devices, or increasing performance with erasure codes.

Figure 3A:
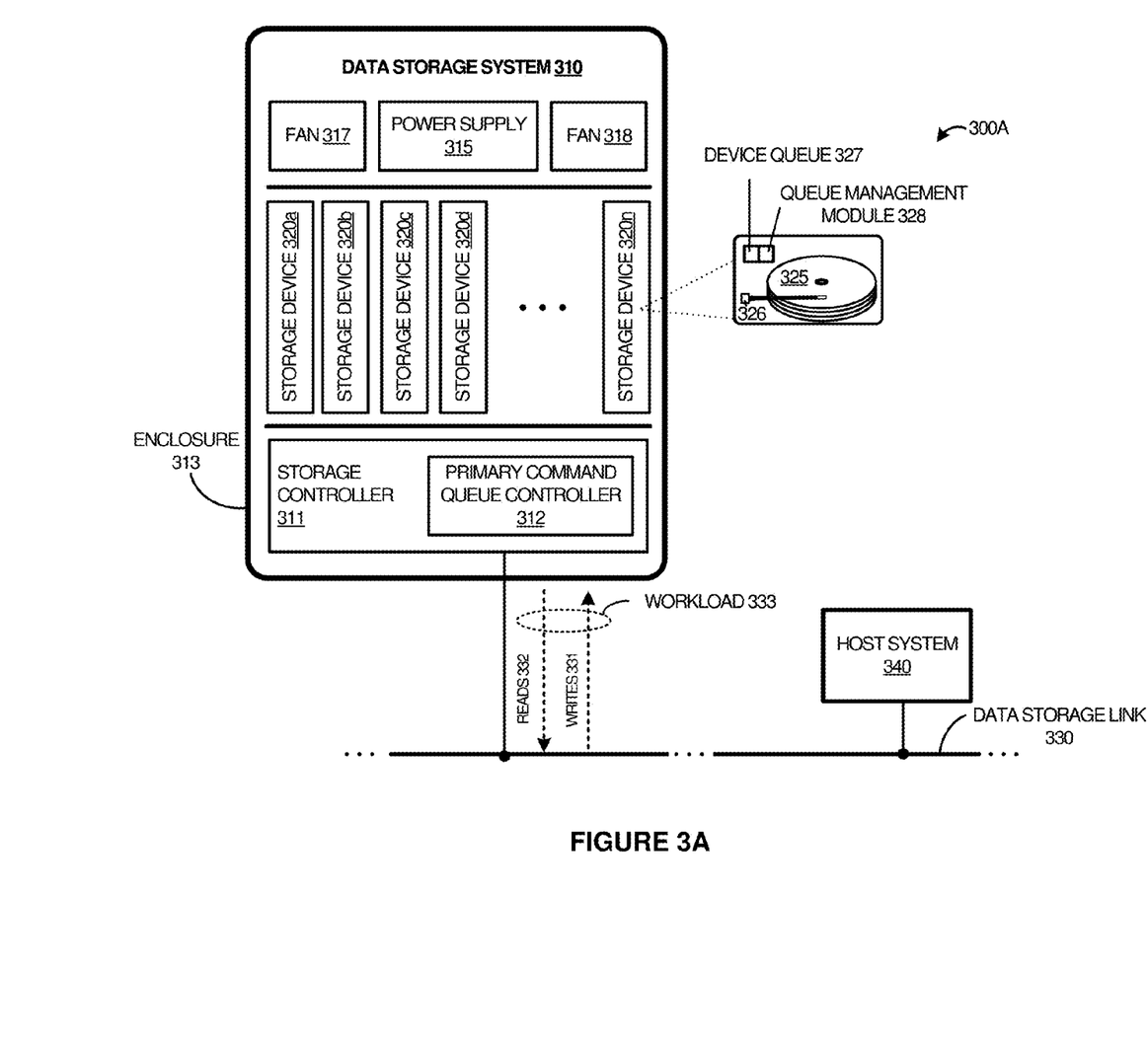
FIGS. 3A and 3B depict system diagrams illustrating various deployments of an example primary command queue controller deployed in an example data system.
Figure 3B:
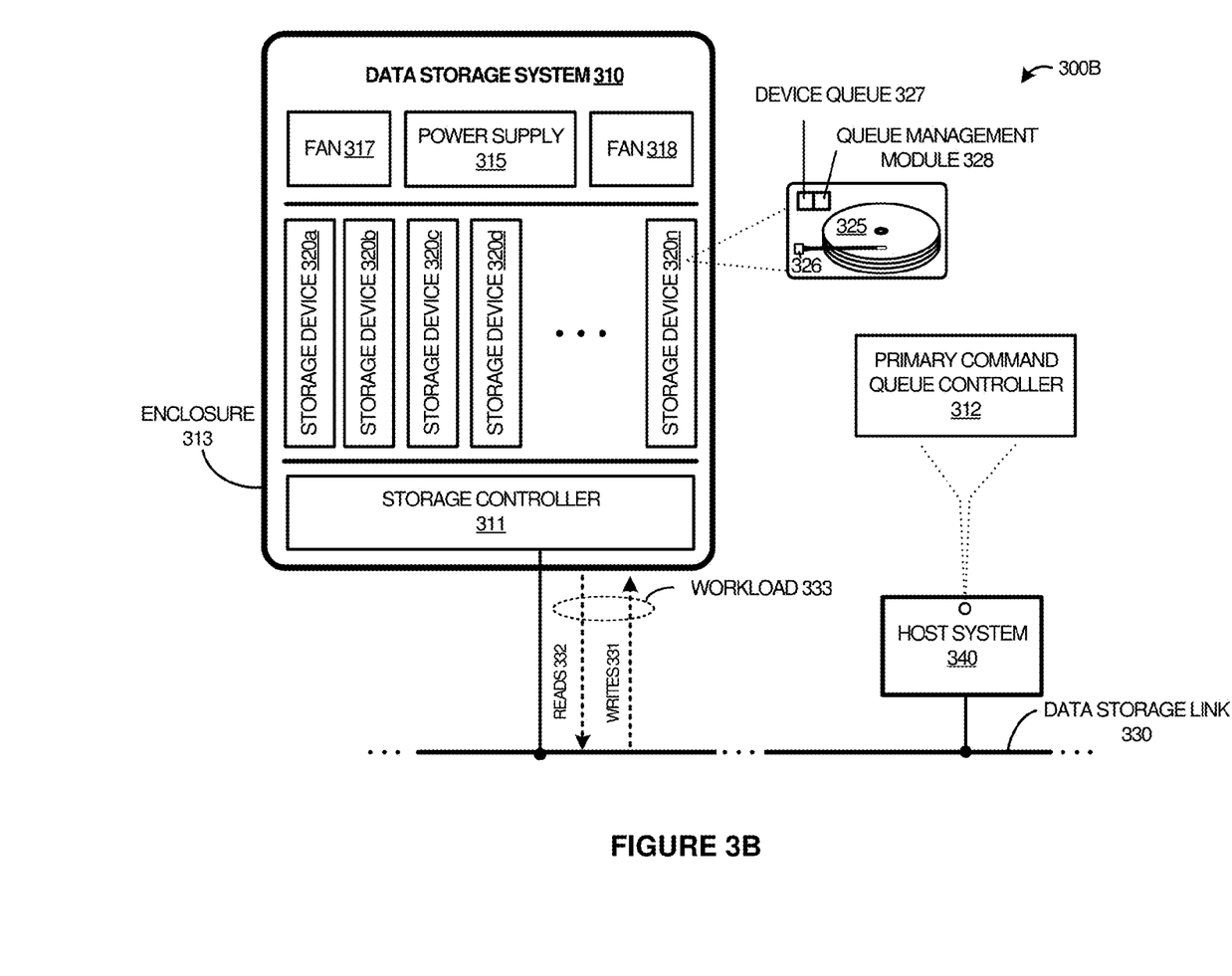

FIGS. 3A and 3B depict system diagrams illustrating example systems 300A and 300B. The example systems 300A and 300B depict various deployments of a primary command queue controller 312. More specifically, FIG. 3A depicts primary command queue controller 312 deployed at the operating system level within storage controller 311. Similarly, FIG. 3B depicts primary command queue controller 312 deployed at the file system level within host system 340. Other deployments including combinations or variations thereof are also possible.

Example systems 300A and 300B include a data storage system 310 and host system 340. Data storage system 310 and host system 340 communicate over data storage link 330. Data storage system 310 can be included in an environment that includes one or more data storage arrays, such as, for example, a rackmount computing environment.

As shown in the example of FIG. 3A, data storage system 310 includes an enclosure 313 encasing a storage controller (or server) 311, power supply 315, fans 317-318, and multiple data storage devices 320a-320n. Each of data storage devices 320a-320n can include one or more rotating storage media. For example, a detailed view of data storage device 320n is shown including rotating media 325, read/write heads/armature assembly 326, a device queue 327 and a queue management module 328. The queue management module 328 can, among other features, order incoming storage commands based, at least in part, on positional information of one or more components of the corresponding data storage device of data storage devices 320a-320n. In some examples, one or more of data storage devices 320a-320n include solid-state storage media in addition to or in lieu of a rotating storage medium. Combinations or variations of rotating, solid-state storage media and/or other media types are also possible. Furthermore, data storage system 310 can include additional components or omit particular components in some embodiments.

Storage controller 311 is communicatively coupled to data storage devices 320a-320n. Although storage controller 311 is shown as an internal component of the data storage system 310 in the example of FIGS. 3A and 3B, it should be understood that storage controller 311 can be included in other elements or components external to data storage system 310. Furthermore, elements, portions or components of storage controller 311 can alternatively or additionally be included in individual ones of data storage devices 320a-320n.

As shown in the example of FIG. 3A, the storage controller 311 includes a primary command queue controller 312. Likewise, in the alternative example of FIG. 3B, the host system 340 includes the primary command queue controller 312. The primary command queue controller 312 can be primary command queue controller 140 of FIG. 1, although alternative configurations are possible.

In operation, data storage system 310 receives storage operations (e.g., read or write transactions) over data storage link 330 issued by host system 340, such as write operations 331 and read operations 332. Responsive to read operations 332, individual data storage devices 320a-320n in data storage system 310 can retrieve data stored thereon (e.g., stored on associated storage media) for transfer to host system 340. Likewise, responsive to write operations 331, individual data storage devices 320a-320n in data storage system 310 store data therein (e.g., stored on associated storage media).

In the examples of FIGS. 3A and 3B, the primary command queue controller 312 generates and/or maintains device queue command handing models 146 for each of the multiple data storage devices 320a-320n to estimate positional information of one or more components of the multiple data storage devices. The primary command queue controller 312 then orders and/or reorders the commands at a primary command queue 142, and subsequently issues the ordered commands, based on the positional information of one or more components of the multiple data storage devices. The storage commands are received at individual device queues 327 where they are likely performed or issued in the order they are received, since the primary command queue controller 312 maintains models of the how each data storage device handles the received commands. As discussed herein, this process typically reduces overall command execution latency of storage commands.

A file system (not shown) can be executed or run by a host system 340 and/or a server (e.g., storage controller 311). The file system determines where data is to be written and maintains information about where the data is written so that the data can be subsequently read or accessed.

It should be understood that other components of data storage system 310 and data storage devices 320a-320n are omitted for clarity in examples of FIGS. 3A and 3B, such as transaction queues, chassis, interconnect, read/write heads, media, armatures, preamps, transceivers, processors, amplifiers, motors, servos, enclosures, and other electrical and mechanical elements.

Data storage system 310 comprises a plurality of data storage devices 320a-320n. The data storage devices 320a-320n are coupled to storage controller 311 by one or more storage links (not shown), which can comprise a serial Advanced Technology Attachment (ATA) interface, Serial Attached Small Computer System (SAS) interface, Integrated Drive Electronics (IDE) interface, Non-Volatile Memory Express (NVMe) interface, ATA interface, Peripheral Component Interconnect Express (PCIe) interface, Universal Serial Bus (USB) interface, wireless interface, Direct Media Interface (DMI), Ethernet interface, networking interface, or other communication and data interface, including combinations, variations, and improvements thereof. Data storage system 310 can also comprise cache systems, chassis, enclosures, fans, interconnect, cabling, or other circuitry and equipment.

Storage controller 311 includes processing circuitry, communication interfaces, and one or more non-transitory computer-readable storage devices. The processing circuitry can comprise one or more microprocessors and other circuitry that retrieves and executes firmware from memory for operating as discussed herein. The processing circuitry can be implemented within a single processing device but can also be distributed across multiple processing devices or sub-systems that cooperate in executing program instructions. Examples of the processing circuitry include general-purpose central processing units, application specific processors, and logic devices, as well as any other type of processing device, combinations, or variations thereof. The communication interfaces can include one or more storage interfaces for communicating with host systems, networks, and the like. The communication systems can include transceivers, interface circuitry, connectors, buffers, microcontrollers, and other interface equipment.

Enclosure 313 comprises structural elements to house and structurally support the elements of data storage system 310. Enclosure 313 can include chassis elements, frames, fastening elements, rackmount features, ventilation features, among other elements. In many examples, enclosure 313 also includes fans or other cooling and ventilation elements for providing airflow to the elements of data storage system 310.

Data storage system 310 also includes a power supply 315 to convert external input power sources or provide various forms of electrical energy to the elements of data storage system 310. Power supply 315 can comprise power conversion elements, power electronics, transformers, voltage conversion circuitry, among other elements. Power supply 315 can also include one or more ventilation fans to provide cooling and ventilation to power supply 315 and to other components in enclosure 313, such as indicated by fans 317-318, or additional fans.

Fans 317-318 provide airflow to elements within enclosure 313, such as the elements of data storage system 310. Fans 317-318 can comprise any fan type, such as axial-flow, centrifugal and cross-flow, or other fan types, including associated ducts, louvers, fins, or other directional elements, including combinations and variations thereof.

Each of data storage devices 320a-320n includes one or more computer readable storage media accessible via one or more read/write heads and associated electromechanical elements. In FIGS. 3A and 3B, an example detailed view of data storage device 320n is shown to highlight rotating media 325 and read/write heads and armature assembly 326. These elements can be included in each of data storage devices 320a-320n, although variations are possible among the data storage devices, such as when solid-state media are employed. Data storage devices 320a-320n can also each include processing circuitry, communication interfaces, armatures, preamps, transceivers, processors, amplifiers, motors, servos, enclosures, and other electrical and mechanical elements.

Data storage devices 320a-320n can each comprise a hard disk drive, hybrid disk drive, solid-state drive, or other computer-readable storage device, including combinations or variations thereof. Data storage devices 320a-320n can each include further elements, such as a device queue 327 and a queue management module 328. The computer-readable storage media of data storage devices 320a-320n can each include rotating magnetic storage media, but can additionally include other media, such as solid-state drive elements, caches, or cache systems. These other media can include solid-state storage media, optical storage media, non-rotating magnetic media, phase change magnetic media, spin-based storage media, or other storage media, including combinations, variations, and improvements thereof. In some examples, data storage devices 320a-320n each comprise a hybrid hard drive employing solid-state storage elements in addition to rotating magnetic storage media. Associated storage media can employ various magnetic storage schemes, such as random write techniques, shingled magnetic recording (SMR), perpendicular magnetic recording (PMR), or heat-assisted magnetic recording (HAMR), including combinations, variations, and improvements thereof.

Host system 340 can include processing elements, data transfer elements, and user interface elements. In some examples, host system 340 is a central processing unit (CPU) of a computing device or computing system. In other examples, host system 340 also includes memory elements, data storage and transfer elements, controller elements, logic elements, firmware, execution elements, and other processing system components. In yet other examples, host system 340 comprises a Redundant Array of Independent Disks (RAID) controller, processor or storage system central processor, such as a microprocessor, microcontroller, Field Programmable Gate Array (FPGA), or other processing and logic device, including combinations thereof. Host system 340 can include (or interface with) user interface elements, which can allow a user of the example systems 300A and 300B to control operations or to monitor the status or operations of the example systems 300A and 300B. The user interface elements can include graphical or text displays, indicator lights, network interfaces, web interfaces, software interfaces, user input devices, or other user interface elements. Host system 340 can also include interface circuitry and elements for handling communications over data storage link 330, such as logic, processing portions, buffers, transceivers, and the like.

Data storage link 330 can be a bus including one or more serial or parallel data links, such as a Peripheral Component Interconnect Express (PCIe) interface, serial ATA interface, Serial Attached Small Computer System (SAS) interface, Integrated Drive Electronics (IDE) interface, ATA interface, Universal Serial Bus (USB) interface, wireless interface, Direct Media Interface (DMI), Ethernet interface, networking interface, or other communication and data interface, including combinations, variations, and improvements thereof. Although one data storage link 330 is shown in FIGS. 3A and 3B, it should be understood that one or more discrete links can be employed between the elements of example systems 300A and 300B.

Figure 4A:
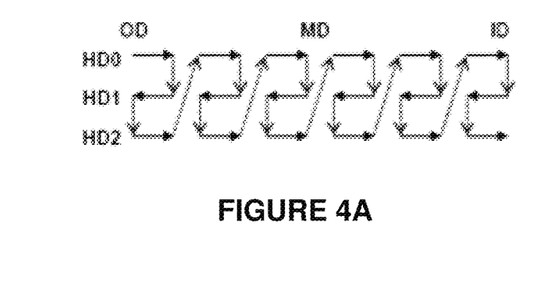
FIGS. 4A and 4B illustrate various example physical layouts of particular data storage devices.
Figure 4B:
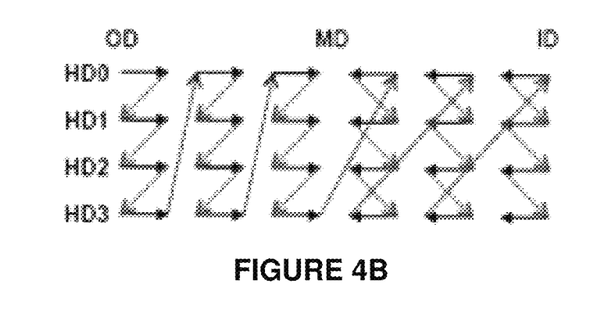

FIGS. 4A and 4B illustrate various example physical layouts of particular data storage devices. The physical layout information illustrated in the examples of FIGS. 4A and 4B can be used to translate or map LBA to CHS for the particular data storage devices. As discussed above, the physical layout can illustrate how logical block addresses (LBAs) are physically mapped on the data storage device. The LBAs are sequential integers. Some systems assume that sequential LBAs are close together. However, even adjacent LBAs can require moving one or more read/write actuator heads quite a bit. For example, LBAs can be arranged in a zig-zag fashion straddling differing surfaces (or platters) and different radii.

As shown in the example of FIG. 4A, the associated data storage device has three heads (or platters). The LBAs start at the outer diameter (OD) of head0 (HD0), drop to the same position of head1 (HD1), and then skip back to the OD and on to head2 (HD2). The process continues at the OD of HD2 and works its way to medium diameter (MD) and then to the inner diameter (ID). The example FIG. 4B is similar to FIG. 4A except there are four heads (or platters), and the physical layout zigzags to the outer diameter (OD) after each head (or platter). The process then continues and works its way to medium diameter (MD) and then to the inner diameter (ID).

Figure 5:
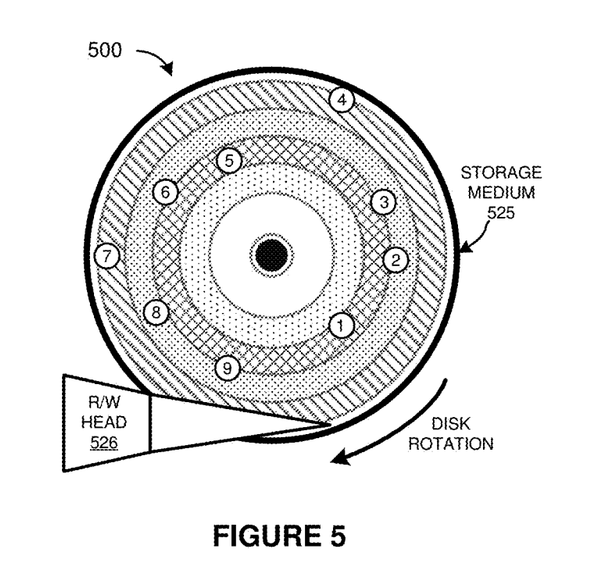
FIG. 5 is a diagram illustrating an example data storage device having at least one storage medium.

FIG. 5 is a diagram illustrating a data storage device 500 having at least one storage medium 525. More specifically, the example of FIG. 5 illustrates locations used by random commands 1-9 on a disk or storage medium 525. As shown, the disk or storage medium 525 rotates clockwise, and the read/write head (or actuator) 526 performs the commands. As shown in the example of FIG. 5, the first command (location 1) is the next numerical choice for scheduling, but the read/write head (or actuator) 526 cannot seek so far from the outer diameter to the inner diameter in the small amount of available rotation time. Accordingly, if the first command (location 1) is scheduled, the operation would be missed, and an entire revolution of the disk would be wasted. The data storage device 500 has a drive controller that is aware of the location of the read/write head 526 relative to the storage medium 525 and the rotational position of the storage medium 525. As discussed herein, a primary command queue 140 can model the behavior of a queue management module 123 of the drive controller 122 in order to appropriately issue commands from the primary command queue 142. Although clockwise disk rotation is shown in the example of FIG. 5, it is appreciated that the disk rotation can be counter-clockwise in some embodiments.

Figure 6:
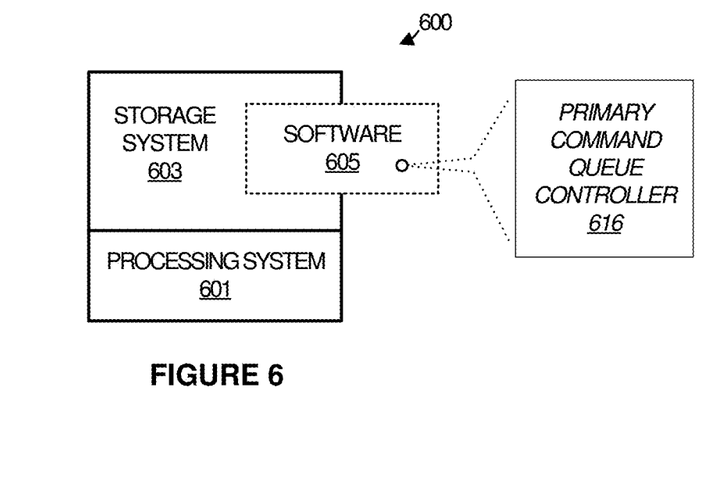
FIG. 6 depicts a block diagram illustrating an example system.

FIG. 6 is a block diagram illustrating system 600. The associated discussion is intended to provide a brief, general description of a suitable computing environment in which various processes may be implemented, in whole or in part. Other configurations of computing devices and software computing systems may be employed to implement these processes.

System 600 may be any type of computing system capable of generating read and write requests to a data storage system, such as a desktop computer, laptop computer, notepad computer, tablet computer, server computer, client computer, mobile computing device, internet appliance, or any combination or variation thereof. System 600 may be implemented as a single computing system but may also be implemented in a distributed manner across multiple computing systems. For example, system 600 may be representative of a host system such as, for example, host system 340 or a storage controller 311 of FIGS. 3A and 3B. Indeed, system 600 is provided as an example of a general purpose computing system that, when implementing processes discussed herein in either a distributed or non-distributed manner, becomes a specialized system.

System 600 includes processing system 601, storage system 603, and software 605. Processing system 601 is communicatively coupled with storage system 603. Storage system 603 stores software 605 which, when executed by processing system 601, directs system 600 to operate as described herein.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include a general-purpose central processing unit, application specific processors, and graphics processors, as well as any other type of processing device.

Storage system 603 may comprise any storage media readable by processing system 601 and capable of storing software 605. Storage system 603 may include volatile and nonvolatile, removable and non-removable media implemented in any method or technology for storage of information, such as computer-readable instructions, data structures, program modules, or other data. Storage system 603 may be implemented as a single storage device but may also be implemented across multiple storage devices or subsystems. Storage system 603 may comprise additional elements, such as a controller, capable of communicating with processing system 601.

Examples of storage media include random access memory, read only memory, magnetic disks, optical disks, and flash memory, as well as any combination or variation thereof, or any other type of storage media. In some implementations, the storage media may be non-transitory storage media. In some implementations, at least a portion of the storage media may be transitory. It should be understood that in no case is the storage media a propagated signal.

Software 605 comprises computer program instructions, firmware, or some other form of machine-readable processing instructions having various processes discussed herein embodied thereon. Software 605 may be implemented as a single application but also as multiple applications. Software 605 may be a stand-alone application but may also be implemented within other applications distributed on multiple devices, including but not limited to productivity application software and operating system software.

In general, software 605 may, when loaded into processing system 601 and executed, transform processing system 601, and system 600 overall, from a general-purpose computing system into a special-purpose computing system customized to distribute storage operations as discussed herein. For example, in at least one implementation, the program instructions can include first program instructions (primary command queue controller 616) that direct system 600 to monitor incoming storage commands for distribution to data storage devices in an enclosure of a data storage system, maintain device queue command handling models for each device queue of the multiple data storage devices in the storage enclosure to estimate positional information of one or more components of the multiple data storage devices, and order the incoming commands in the primary command queue based, at least in part, on the positional information of the one or more components of the multiple data storage devices, among other operations.

Encoding software 605 may also transform the physical structure of storage system 603. The specific transformation of the physical structure may depend on various factors in different implementations of this description. Examples of such factors may include, but are not limited to: the technology used to implement the storage media of storage system 603, whether the computer-storage media are characterized as primary or secondary storage, and the like.

For example, if the computer-storage media are implemented as semiconductor-based memory, software 605 may transform the physical state of the semiconductor memory when the software is encoded therein. For example, software 605 may transform the state of transistors, capacitors, or other discrete circuit elements constituting the semiconductor memory.

A similar transformation may occur with respect to magnetic or optical media. Other transformations of physical media are possible without departing from the scope of the present description, with the foregoing examples provided only to facilitate this discussion.

System 600 may have additional devices, features, or functionality. For example, system 600 may optionally have input devices such as a keyboard, a mouse, a voice input device, or a touch input device, and comparable input devices. Output devices such as a display, speakers, printer, and other types of output devices may also be included. System 600 may also contain communication connections and devices that allow system 600 to communicate with other devices, such as over a wired or wireless network in a distributed computing and communication environment. These devices are well-known in the art and need not be discussed at length here.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage system, comprising:
   multiple data storage devices each configured to store data;
   an enclosure configured to encase and physically support the multiple data storage devices; and
   a control system configured to:
     estimate positional information of one or more components of the multiple data storage devices based on device queue command handling models for the multiple data storage devices; and
     manage a primary command queue by ordering incoming storage commands based, at least in part, on the positional information.

2. The data storage system of claim 1, wherein the control system is further configured to maintain the device queue command handling models for device queues of the multiple data storage devices.

3. The data storage system of claim 2, wherein to maintain device queue command handling models, the control system is further configured to:
   receive synchronization information from one or more of the multiple data storage devices; and
   process the synchronization information to synchronize the control system with the one or more of the multiple data storage devices.

4. The data storage system of claim 3, wherein the synchronization information comprises one or more timestamps that indicate one or more of when a particular data storage device commenced execution of an issued storage operation or when the particular data storage device completed the execution of the storage operation.

5. The data storage system of claim 2, wherein the control system is further configured to generate the device queue command handling models for each device queue of the multiple data storage devices based on respective physical layout information and device queue management algorithmic information.

6. The data storage system of claim 5, wherein the device queue management algorithmic information indicates how a particular data storage device processes commands in a corresponding device queue.

7. The data storage system of claim 5, wherein the device queue management algorithmic information comprises a rotational position optimization (RPO) algorithm.

8. The data storage system of claim 5, wherein the physical layout information comprises a logical block address (LBA) to cylinder, head and sector (CHS) translation for a corresponding data storage device.

9. The data storage system of claim 1, wherein the control system is further configured to monitor incoming storage commands for distribution to the multiple data storage devices.

10. A method of managing a primary command queue, the method comprising:
   monitoring incoming storage commands for distribution to multiple data storage devices in an enclosure of a data storage system;
   maintaining device queue command handling models for each device queue of the multiple data storage devices in the storage enclosure to estimate positional information of one or more components of the multiple data storage devices; and
   ordering the incoming commands in the primary command queue based, at least in part, on the positional information of the one or more components of the multiple data storage devices.

11. The method of claim 10, further comprising:
receiving physical layout information associated with each of the multiple data storage devices;
receiving device queue management algorithmic information from each of the multiple data storage devices; and
generating the device queue command handling models based on the corresponding physical layout information and the device queue management algorithmic information.

12. The method of claim 11, wherein the device queue management algorithmic information indicates how a particular data storage device processes commands in a corresponding device queue.

13. The method of claim 11, wherein the device queue management algorithmic information comprises a rotational position optimization (RPO) algorithm.

14. The method of claim 11, wherein the physical layout information comprises a logical block address (LBA) to cylinder, head and sector (CHS) translation for a corresponding data storage device.

15. The method of claim 10, wherein maintaining the device queue command handling models comprises:
receiving synchronization information from one or more of the multiple data storage devices; and
processing the synchronization information to synchronize the control system with the one or more of the multiple data storage devices.

16. The method of claim 15, wherein the synchronization information comprises one or more timestamps.

17. The method of claim 16, wherein the timestamps indicate one or more of when a particular data storage device commenced execution of an issued storage operation or when the particular data storage device completed the execution of the storage operation.

18. The method of claim 10, wherein the incoming commands in the primary command queue are further ordered for one or more of reducing vibration of one or more of the multiple data storage devices, reducing seek current overages of one or more of the multiple data storage devices, increasing performance with erasure codes, reducing overall system power consumption, or reducing average or tail command execution latency.

19. The method of claim 10, wherein the positional information comprises read/write head positions of each of the multiple data storage devices.

20. An apparatus comprising:
one or more non-transitory computer-readable storage media; and
program instructions stored on the one or more non-transitory computer-readable storage media, wherein the program instructions, when executed by a processing system, direct the processing system to:
track incoming storage commands for distribution to data storage devices in an enclosure of a data storage system;
monitor device queue command handling models for each device queue of the multiple data storage devices in the storage enclosure;
estimate positional information of one or more components of the multiple data storage devices based on the device queue command handling models; and
order the incoming commands in a primary command queue based, at least in part, on the positional information of the one or more components of the multiple data storage devices.

21. A storage system comprising:
means for accessing device queue command handling models for data storage devices in a storage enclosure;
means for estimating positional information of one or more components of the data storage devices using the device queue command handling models; and
means for ordering incoming commands in a primary command queue based, at least in part, on the positional information.

* * * * *